United States Patent [19]

Kowanz et al.

[11] Patent Number: 5,096,643
[45] Date of Patent: Mar. 17, 1992

[54] METHOD OF MANUFACTURING MICROVALVES

[75] Inventors: Bernd Kowanz, Linkenheim; Dirk Schmidt, Stutensee; Wolfgang Ehrfeld, Karlsruhe, all of Fed. Rep. of Germany

[73] Assignees: Burkert GmbH Werk Ingelfingen, Ingelfingen; Kernforschungszentrum Karlsruhe GmbH, Karlsruhe, both of Fed. Rep. of Germany

[21] Appl. No.: 527,193

[22] Filed: May 23, 1990

[30] Foreign Application Priority Data

May 29, 1989 [DE] Fed. Rep. of Germany ....... 3917423

[51] Int. Cl.$^5$ .............................. B29C 39/10
[52] U.S. Cl. .................... 264/130; 137/15; 137/625.3; 164/47; 164/72; 264/242; 264/255; 264/264; 264/317; 264/338
[58] Field of Search .................. 137/15, 625.28, 625.3; 264/227, 226, 225, 317, 130, 338, 242, 250, 255, 264; 29/890.127, 890.124; 164/188, 47, 72; 204/3

[56] References Cited

U.S. PATENT DOCUMENTS

| 3,016,887 | 11/1962 | Clarke | 264/317 |
| 3,314,644 | 4/1967 | Dwyer et al. | 264/242 |
| 3,394,916 | 7/1968 | Birr | 264/242 |
| 3,616,520 | 11/1971 | Bucalo | 264/DIG. 44 |
| 3,723,585 | 3/1973 | Nussbaum | 264/226 |
| 4,231,982 | 11/1980 | Jansson | 264/227 |
| 4,604,254 | 8/1986 | Yamamoto et al. | 264/242 |
| 4,777,002 | 8/1988 | Pütz | 264/255 |
| 4,871,623 | 10/1989 | Hoopman et al. | 204/3 |
| 4,917,846 | 4/1990 | Takasa et al. | 264/317 |

Primary Examiner—Jay H. Woo
Assistant Examiner—Robert B. Davis
Attorney, Agent, or Firm—Sixbey, Friedman, Leedom & Ferguson

[57] ABSTRACT

The plate-like valve elements (10 and 20) of the microvalve are provided with a plurality of valve seats and, respectively, corresponding valve members. The sealing surfaces of a secondary valve element (10) are respectively formed by molding to copy the sealing faces of a primary valve element (20) so that the sealing surfaces of both valve elements are completely complementary to each other. The sealing surfaces need no further processing such as machining. Despite liberal tolerances of manufacture a high precision register of the valve elements in relation to each other is ensured.

13 Claims, 4 Drawing Sheets

METHOD OF MANUFACTURING MICROVALVES

BACKGROUND OF THE INVENTION

The invention relates to microvalves and to method of manufacturing them.

More particularly but not exclusively the invention relates a method for the production of a microvalve arrangement comprising two generally plate-like or tabular, oppositely placed valve elements, of which the one possesses a plurality of valve seats and the other element possesses a plurality of corresponding valve members. The invention further relates to a microvalve as produced by the said method.

There is an every increasing need for valve in a highly miniaturized form, which may be termed microvalves. For high precision metering of liquids and gases short switching times, a low dead volume and a low wear rate are called for. In principle such requirements may be met by ensuring that there is a low inertia of the moving parts and a small actuation displacement. In order to achieve a large effective rated width of a valve seat despite a small stroke of the valve member, it is possible for a large number of corresponding valve members to be connected in parallel with each other. The sealing surfaces of the individual valve seats and valve members then have to have minute dimensions and their structures have to be produced in high precision techniques in order to ensure full sealing in the shut setting of the valve. However, with conventional techniques as used in precision engineering it is only possible to attain a degree of accuracy which still limits the degree of miniaturization and furthermore makes an extremely elaborate production process necessary.

SHORT SUMMARY OF THE PRESENT INVENTION

Accordingly one object of the present invention is to device a microvalve which does not require elaborate machining.

A further object of the invention is to provide such a microvalve which provides for a highly accurate register of the sealing surfaces and thus opens up the possibility of rational mass production.

In order to achieve these or other objects appearing from the present specification, claims and drawings, the invention provides a method of the initially described such that the sealing surfaces of a secondary valve element are produced by molding from the sealing surfaces of a primary valve element.

The microvalve produced in accordance with the invention thus has two plate-like or tabular valve elements, of which the one has a plurality of valve seats and the other has an equal number of corresponding valve members, the cooperating sealing surfaces of the two valve elements being complementary to each other with a submicron degree of accuracy. Since the use of conventional technology only make it possible to produce nothing more than a micron range of accuracy without there being the least chance of producing a plurality of separate sealing surfaces on the two valve elements, the microvalve in accordance with the invention has the desirable property that the corresponding sealing surfaces of the two valve elements are complementary to each other with a degree of accuracy extending into the submicron range, this being a material or essential distinction over prior art valves.

In the method in accordance with the invention the high precision of the complementary configuration of the sealing surfaces of the two valve elements is produced by molding to copy the sealing surfaces of the one valve element on the sealing surfaces of the other valve element. Dependent on the nature of the material being used, prior to such molding the sealing surfaces of the at least one valve element may be endowed with a stripping or separating material so that the surfaces are more readily separated. Alternatively the molding material may be provided with an internal separating substance or agent.

It is also a particularly preferred feature of the invention to design the sealing surfaces so that they are inclined in relation to the direction of the stroke, since this promotes a self-aligning action.

The invention also contemplates as a particularly advantageous feature the arrangement of the sealing seats and the valve member in parallel rows so that within each row they are oppositely offset with respect those in the adjacent rows, i.e. in a quincunx array.

The microvalves provided by the invention open up new applications. Owing to the extremely short switching times such microvalves may be incorporated in automatic control systems and controllers. It is for instance possible to provide proportional rate control or automatic control systems using pulse width modulation. The microvalves may thus be directly actuated by digital signals. A precondition in this respect is the use of a valve drive, which also makes possible extremely short switching times with a low switching power and an extremely large number of switching operations. The microvalve in accordance with the invention is thus preferably equipped with a piezoelectric or magnetostrictive drive. The possibilities of a high speed and high precession metering action open up the way to novel equipment, particularly in the field of chemical analysis and in medicine.

The molding of the sealing surfaces in accordance with the invention of the one valve element from those of the other valve element may be performed with techniques used in the molding of plastics, by casting or by galvanoforming.

Further features and advantages of the invention will be gathered from the ensuing description of several embodiments thereof referring to the drawings.

DETAILED DESCRIPTION OF WORKING EMBODIMENTS OF THE INVENTION

The method for the production of a microvalve illustrated in FIG. 1 includes five stages, which are denoted a through e. In stage a the starting point is a valve element 10, which consists of an alternating succession of valve members 12 and valve ports 14, which are of equal size and have a complementary configuration. In cross section the valve members 12 and valve ports are trapezoidal. In plan view they are square, as will be seen from FIG. 2.

This valve element 10 is endowed with the required structure using a conventional method while not aiming at a high degree of accuracy. It is possible to produce it from a (100) disk of monocrystalline silicon using anisotropic etching. Another possible method of production the production involves the partial irradiation of a radiation-sensitive resist and plastic molding. In either case rational manufacture may be employed. Dry etching methods as used in the manufacture of semiconductors, as for instance ionic etching or sputtering methods are particularly suitable.

Figure 1A:
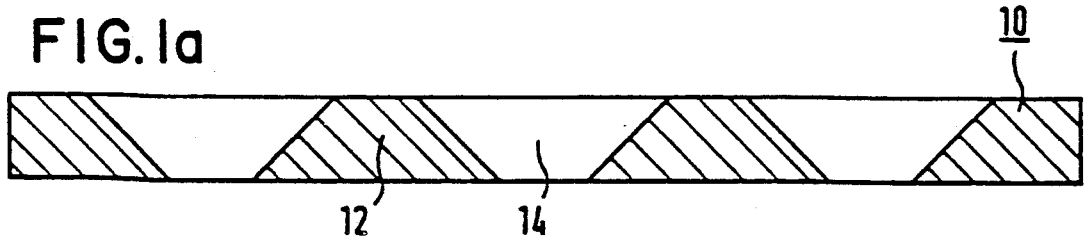
FIG. 1 shows diagrammatic cross sectional views, which represent a first embodiment of the method in accordance with the invention for the production of a microvalve.
Figure 1B:
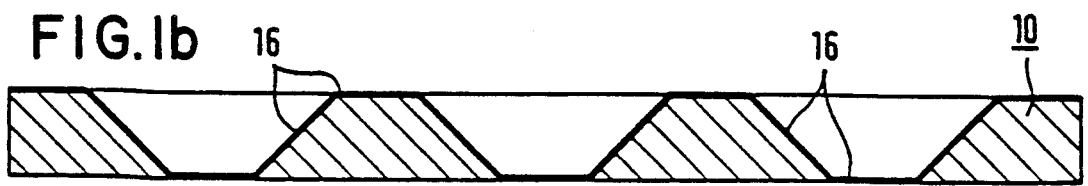
Figure 1C:
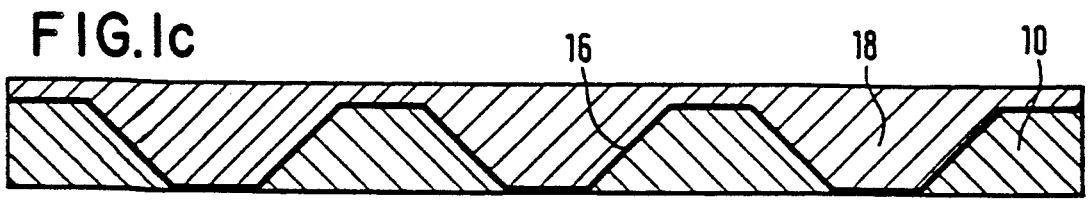
Figure 1D:
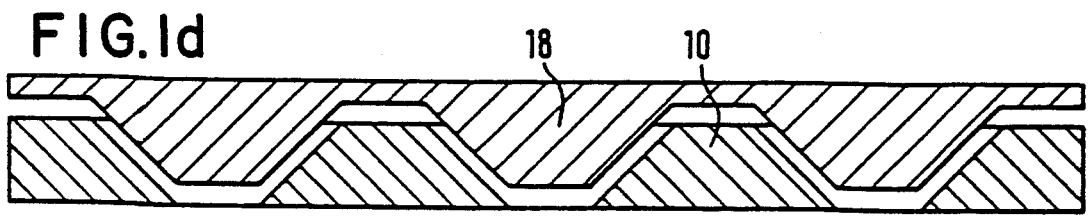

In the method stop b the valve element 10 is provided with a stripping or separating layer 16, which is applied to at least the sealing surfaces of the valve element, namely the surfaces oblique in relation to the plane of the valve element, but in FIG. 1b there is such application to the entire upper face of the valve element 10. The material for such separating or stripping layer 10 may be one which is able to be selectively removed without affecting the materials of the valve elements.

In the following stage c there is then the molding of the valve element 10 provided with the separating layer 16. In the case of preferred forms of the invention this stage is performed by injection molding or by reactive casting. In such a casting method the valve element 10 with a base plate and a cover plate will form the mold. The molding 18 formed in this manner has a surface configuration which is an exact copy of the valve element 10.

In the method step d the separating layer 16 is eliminated.

Figure 1E:
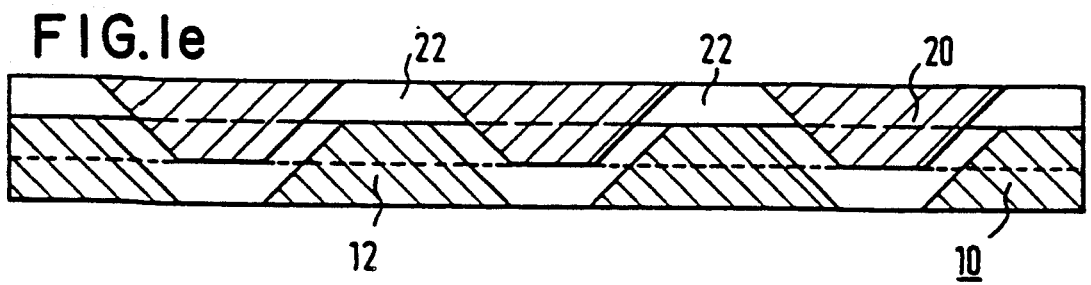

In the method step e the rear side of the molding 18, which has now been removed from the valve element 10, is lapped and/or polished until a valve element 20 with valve ports 22 results, which has the same form as the valve ports 14 of the valve element 10 and which are respectively associated with the valve member 12, shown thereunder in FIG. 1e, of the valve element 10. The corresponding sealing surface of the valve elements 10 and 20 are molded from each other and thus have a high degree of complementary precision. The valve element 10 may be produced with relatively liberal tolerances, since every deviation in the surface form or the orientation and positioning on the sealing surfaces of the valve element 10 may be precisely imitated or copied by the sealing surfaces of the valve element 20. The result is thus a highly accurate register of the two valve eliminates 10 and 20 in relation to each other without subsequent machining.

In the case of one possible form of the method of manufacture the valve element 10 is molded from a pattern part, more especially by plastic molding.

In the case of a further form of the method the molding is performed by galvanoforming in the method step c by deposition of metal on the separating layer 16.

In a further possible form of the method in accordance with the invention the molding takes place in the method step c by pressing one of the valve elements against a soft material, more especially plastic or resin material.

Figure 2:
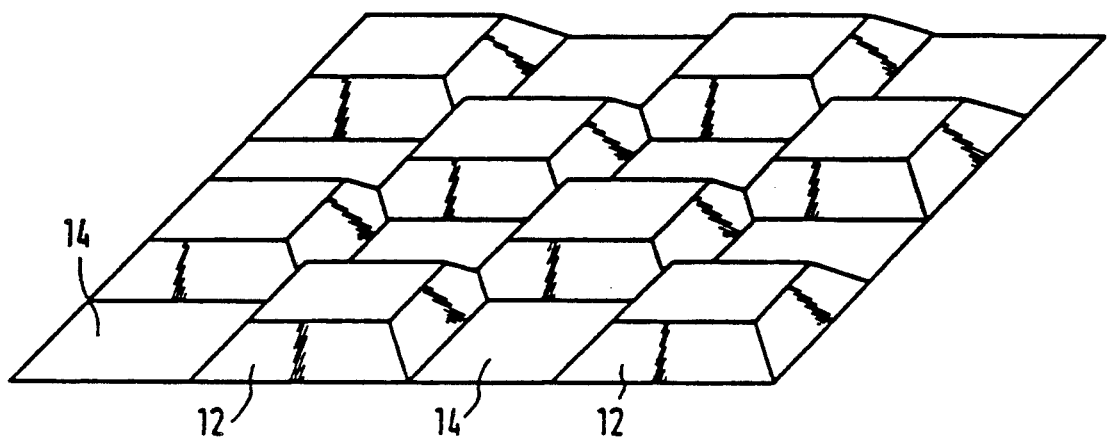
FIG. 2 is a diagrammatic perspective view of a valve element of the microvalve.

FIG. 2 diagrammatically shows the structure of a preferred embodiment of a valve element, which has been manufactured using the described method. The valve element shown in FIG. 2 may be the valve element 10 or 20 as shown in FIG. 1. The individual valve members 12 are arranged in parallel rows so that they are offset in relation to those in two adjacent rows by one unit in the longitudinal direction of the rows and so that, with the exception of the edge parts, one respective valve port 14 is surrounded by four valve members 12 and vice versa, i.e. there is a quicunx array. In plan view the valve members and valve ports are preferably square.

Figure 3A:
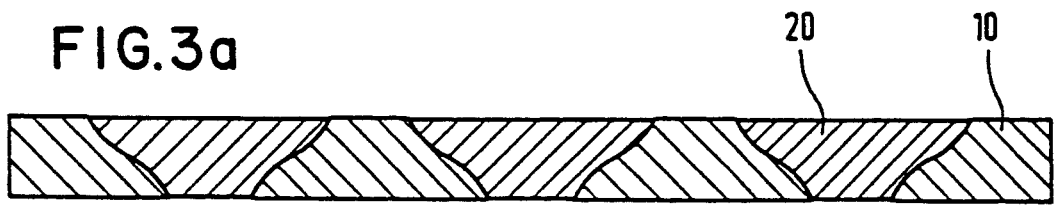
FIG. 3 shows two cross sectional views in order to explain the function of the microvalve in accordance with the invention.
Figure 3B:
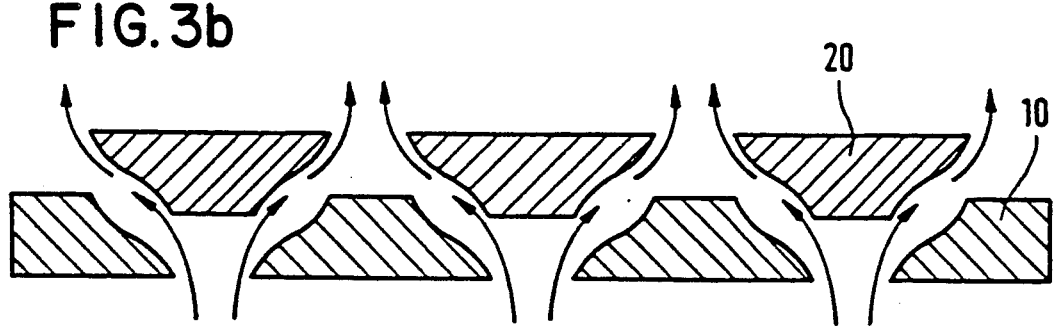

In manner of operation of the valve elements 10 and 20 of the microvalve in accordance with the invention will be gathered from FIG. 3. FIG. 3a shows the valve elements 10 and 20 in the shut position; FIG. 2b shows them in the open setting. The trapezoidal shape of the valve members and, respectively, the valve ports means that the flowing medium is only deflected to a slight extent. The flow resistance is correspondingly low on passage through the two valve elements 10 and 20. FIG. 3b also shows that despite a short valve stroke a large effective rated width or clearance is achieved, that is to say there is a large flow cross section in the opened state of the valve elements 10 and 20.

Figure 4:
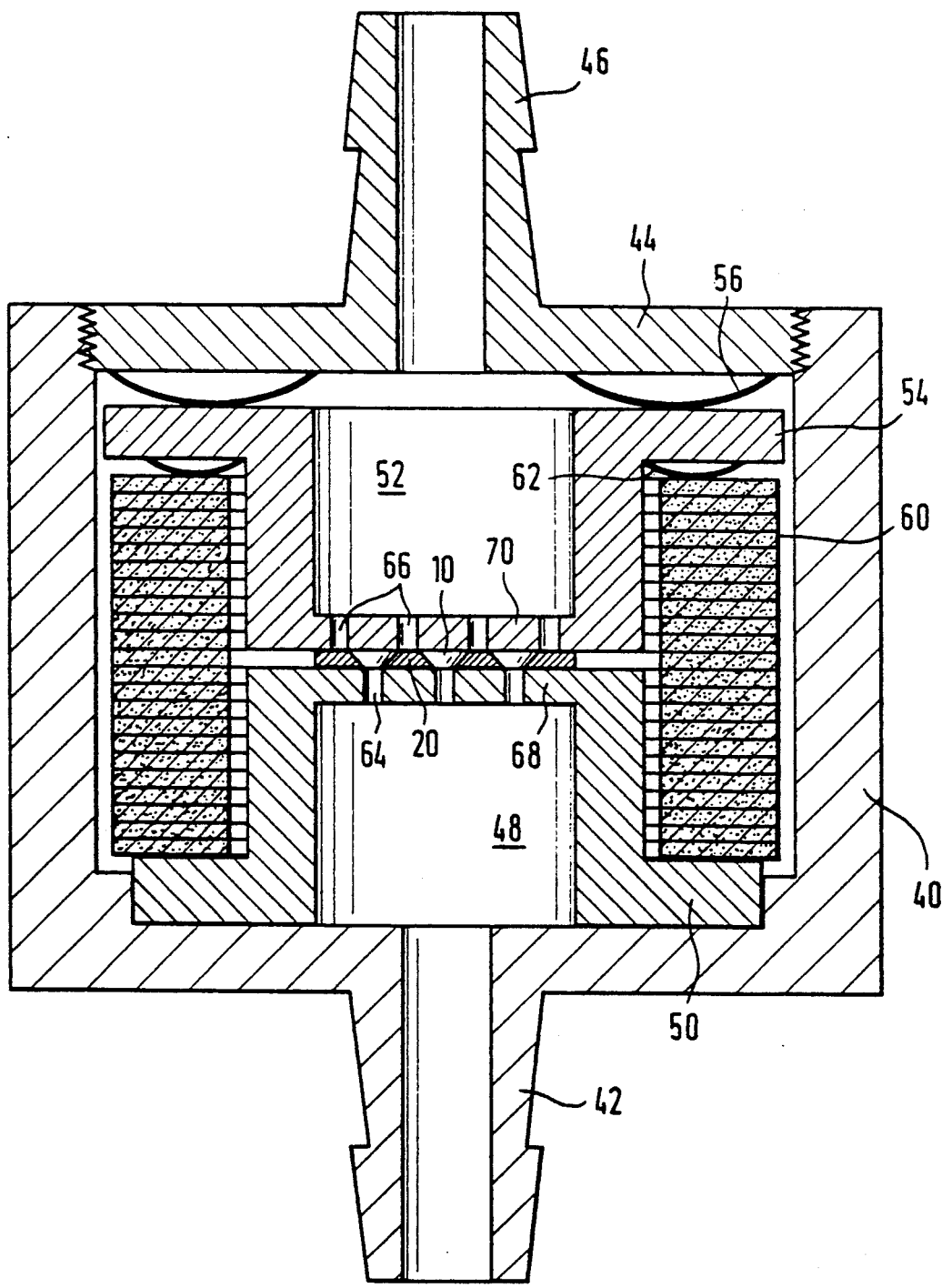
FIG. 4 shows a diagrammatic cross section taken through a design of the microvalve equipped with a piezoelectric drive.

A first possible design of a complete microvalve with the valve elements 10 and 20 is shown diagrammatically in FIG. 4. The valve drive and the valve elements are mounted in a bell-like housing 40 with an axial connection spigot 42. On its side remote from the spigot 42 the housing 40 is shut off by a cover 44, which has an axial connection spigot 46. The valve drive includes a cylindrical part 48, fixed to the housing 40, and coaxial to the spigot 42. This part 48 has a flange 50 bearing on the bottom of the housing 40. The drive further includes a cylindrical moving part 52, which is coaxial in relation to the spigots 42 and 46 and has a flange 54 which bears on a plate spring 56 against the cover 44. The drive also includes a plurality of rings of piezoelectric material 60, which are stacked with alternating connections with a power supply, such stack being arranged between the mutually adjacent surfaces of the flanges 50a and 54. This stack bears against the flange 54 via a further plate spring 62 or spring washer. At adjacent ends thereof the cylindrical parts 48 and 52 bear the tabular or plate-like valve elements 10 and 20. The valve ports of these valve elements 10 and 20 are aligned with respectively associated axial ducts or channels 64 and 66, which are arranged in a carrier plate 68 or, respectively, 70 of the stator part and, respectively, of the moving part 52. In the illustrated working embodiment the carrier plate 70 simultaneously constitutes the valve element 10; the valve element 20 produced by molding is on the other hand mounted as a separate part on the carrier plate 68 and attached to same.

The connection spigots 42 and 46 and the channels 64 and 66 open into a cylindrical valve space divided into two parts by the valve elements.

On the application of an operating or actuating voltage to the rings 60 of piezoelectric material the latter expands the axial direction. Although each individual piezoelectric element only expands by a small amount, the stacking of a plurality of such piezoelectric elements means that there is a summation of the amounts of such expansion. The designer may thus readily produce the desired valve stroke by selection of the number of stacked piezoelectric rings 60.

The plate spring or spring washer 62, which is harder than the plate spring 56, is provided to take up play between the stack of rings 60 and the flanges 50 and 54. The plate spring 56 acts as a return spring, which biases the actuator part 54 towards the shut position so that the valve element 10 returns into its shut position bearing against the valve element 20 when excitation of the piezoelectric rings 60 has ceased.

The view of FIG. 4 will serve to indicate some advantageous properties of the microvalve in accordance with the invention. Between the connection spigots 42 and 46 the fluid passes through the valve in the axial direction, the valve elements 10 and 20 only causing a slight deflection of the flow. The resistance to flow is accordingly low. Since furthermore the piezoelectric elements are able to be operated with frequencies far beyond the kHz range, extremely short switching times may be realized.

The design of the microvalve also makes it suitable for automated manufacture, since all the components are assembled in the axial direction. Since furthermore the valve elements 10 and 20 have a self-aligning effect during closing of the valve, high precision guide means are not required.

Figure 5:
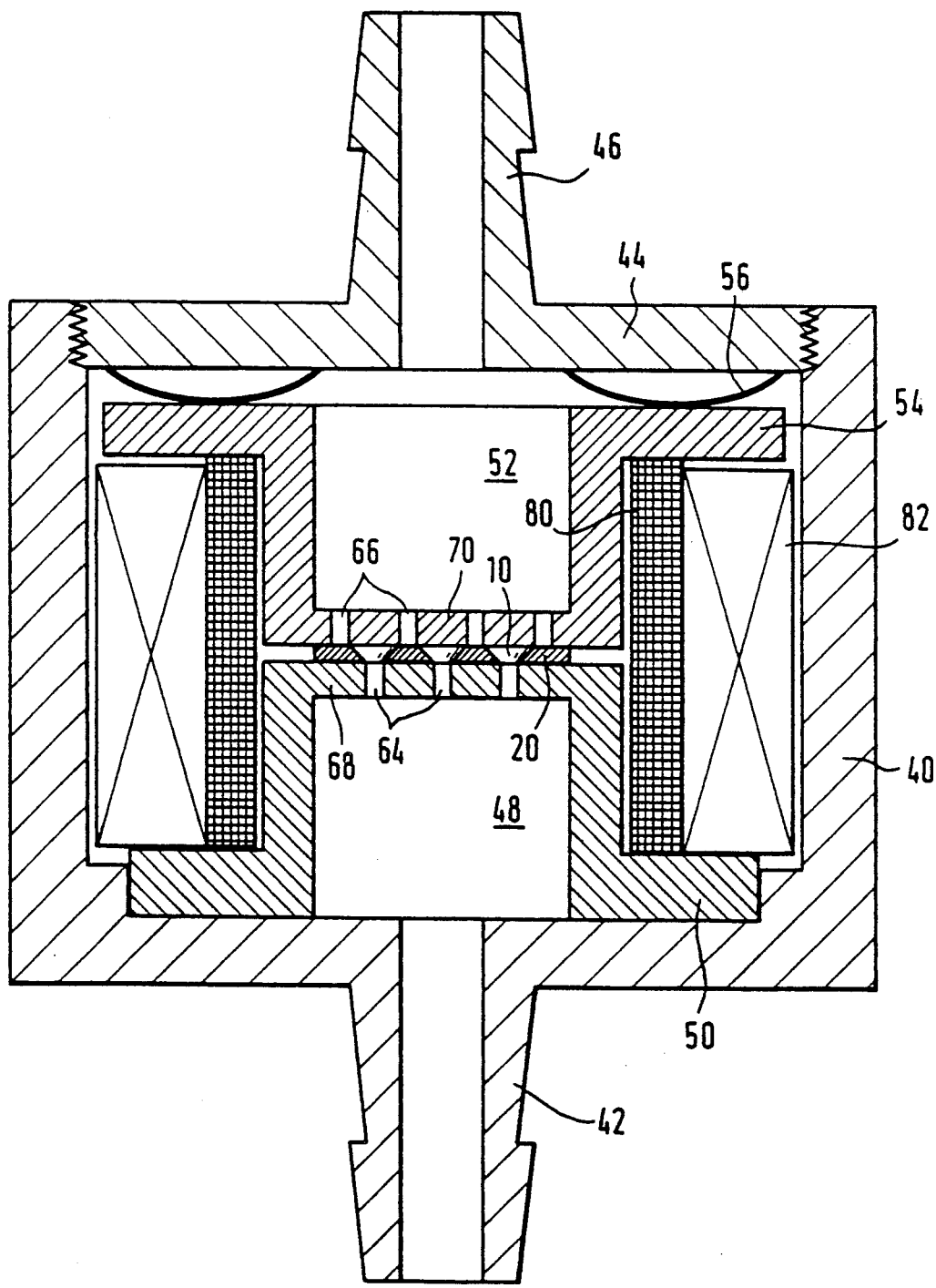
FIG. 5 is a diagrammatic cross section taken through a design of the microvalve, this time with a magnetostrictive drive.

The design of the microvalve shown in FIG. 5 differs from that of FIG. 4 only with respect to the valve drive so that only the latter will now be described in more detail. In lieu of the stack of piezoelectric rings a tubular magnetorestrictive element 80 is mounted between the flanges 50 and 54; the tubular magnetostrictive element 80 is surrounded by an exciting coil 82. When the exciting coil is energized the tubular magnetostrictive element 80 will expand in the axial direction and will force the flanges 50 and 54 apart in the axial direction. The plate spring 56 will act in the same fashion as described in connection with the embodiment as shown in FIG. 4 as a return spring.

In addition to a piezoelectric or magnetostrictive valve drive conventional drives may also be used, which are optimized for a high switching frequency. For special applications it is also feasible to use bimetallic valve drives or plastic memory metal valve drives.

We claim:

1. A method of producing a microvalve comprising the steps of:
   a) providing a plate-shaped first valve element having an alternating succession of closure bodies and openings, said closure bodies and openings having sealing surface portions;
   b) producing a second valve element by molding against at least said sealing surface portions of said first valve element to produce closure bodies and openings complementary in shape and complimentary in arrangement to the closure bodies of said first valve element;
   c) separating said first and second valve elements from each other;
   d) mounting said first and second valve elements in a valve housing defining a fluid flow path, in a mutually opposed relationship between the closure bodies and openings of said valve elements to provide a plurality of cooperating pairs of closure bodies and openings, and transverse to said fluid flow path; and
   e) coupling said first and second valve elements to an actuator accommodated in said valve housing for moving the closure bodies and openings of one of said valve elements into sealing contact with or away from the closure bodies and openings of the other of said valve elements.

2. The method as claimed in claim 1, comprising the steps of applying a separating layer of a selectively attackable material on at least said sealing surface portions of said closure bodies and openings prior to step b) and eliminating said separating layer by selectively attacking said material prior to step c).

3. The method as claimed in claim 1, wherein said sealing surface portions of the first and of the second valve elements are arranged so as to be oblique in relation to a plane which is parallel to the first and second valve elements.

4. The method as claimed in claim 2, wherein the elimination of the separating layer is performed by selective etching.

5. The method as claimed in claim 1, wherein the first valve element is produced by a rational manufacturing technique of low accuracy.

6. The method as claimed in claim 1, wherein the second valve element is produced by molding of plastic material.

7. The method as claimed in claim 6, wherein the molding of the second valve element is performed by plastic molding in an injection molding technique.

8. The method as claimed in claim 1, wherein the second valve element is produced from a soft material and said molding includes pressing the first valve element against said soft material.

9. The method as claimed in claim 1, wherein the second valve element is produced by galvanoforming.

10. The method as claimed in claim 1, wherein the second valve element is produced by casting of a metal.

11. The method as claimed in claim 1, wherein the molding of the second valve element is performed by using a reactive casting method.

12. The method as claimed in claim 1, wherein the second valve element produced by molding includes excess material bridging beyond said sealing surfaces of the second valve element and the method further includes a step of removing said excess material by a method selected in the group consisting of lapping, polishing and milling, in order to free said openings between said sealing surface portions of said second valve element.

13. The method as claimed in claim 1, wherein said closure bodies and openings are of equal size and complimentary shape.

* * * * *